Sept. 28, 1948.    W. B. PRIDY    2,450,204
TRUCK BODY AND BOLSTER
Filed Aug. 6, 1945    2 Sheets-Sheet 1

INVENTOR.
WHETSTINE B. PRIDY
BY
*James M. Abbett*
ATTORNEY.

Sept. 28, 1948.  W. B. PRIDY  2,450,204
TRUCK BODY AND BOLSTER

Filed Aug. 6, 1945  2 Sheets-Sheet 2

INVENTOR.
WHETSTINE B. PRIDY
BY James M. Abbell
ATTORNEY.

Patented Sept. 28, 1948

2,450,204

UNITED STATES PATENT OFFICE 2,450,204

TRUCK BODY AND BOLSTER

Whetstine B. Pridy, Long Beach, Calif.

Application August 6, 1945, Serial No. 609,057

6 Claims. (Cl. 296—28)

This invention relates to a vehicle used in hauling and particularly pertains to a truck body and bolster.

In performing tasks of heavy hauling on trucks or the like it is often necessary to place bolsters on the truck body to support the objects being hauled. This is particularly true in connection with the hauling of drill pipe and well casing in the oil fields, in which instance bolsters are placed upon the truck body to lie transversely of the body and beneath the pipe or casing which rests on the bolsters. In many instances when drill pipe and casing is transported it must be carried for a long distance and often on the return trip other articles are carried which do not require the use of bolsters to cause them to remain in proper position upon the truck bed. Thus, on these trips the bolsters are in the way, and since they are quite heavy they must be moved to some part of the truck where they will not obstruct the load. It also happens in connection with the transportation of pipe and casing that the pipe is of a length which makes it necessary for one end to rest upon a bolster on the truck and the other end to rest upon a bolster on a trailer. When a load of this character is hauled it is desirable to provide bolsters which are pivotally mounted upon vertical axes so that the load will not be disturbed when a truck and trailer negotiate a turn. It is desirable, therefore, to provide a truck body having a bolster structure which is incorporated directly within the platform of the truck and which may be readily manipulated to assume a position above the level of the body platform and to be carried in such a way as to allow the bolster to swing in a horizontal plane over the face of the truck platform and around a central vertical axis. It is the principal object of the present invention, therefore, to provide a truck body having a bolster incorporated within its structure, said bolster elements normally acting to form a section of the truck platform and being designed so that they may be elevated to form a bolster above the plane of the truck platform and supported to swing horizontally around a central pivotal axis.

The present invention contemplates the provision of a truck frame carrying a platform, a section of which platform is formed of elements which may be elevated above the plane of the platform and folded to produce a truck bolster, the structure being directly carried upon a central vertical pivot around which the bolster may swing in a horizontal plane, the central pivot being associated with power means for elevating the bolster elements to their operative position above the plane of the truck platform.

The invention is illustrated by way of example in the accompanying drawings in which.

Figure 1:
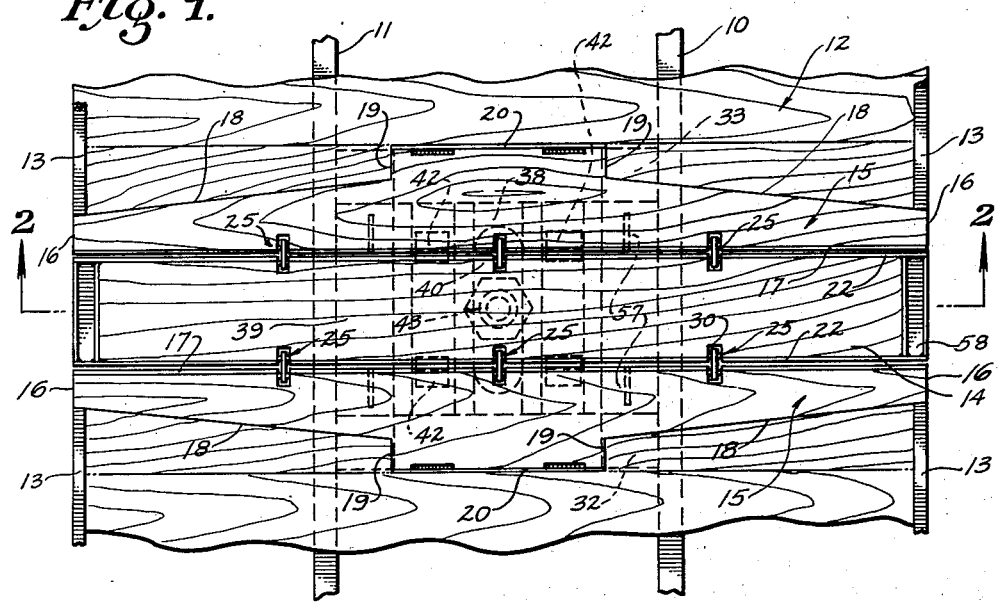
Figure 1 is a view in plan showing a section of a truck platform and the bolster elements forming a part thereof.
Figure 2:
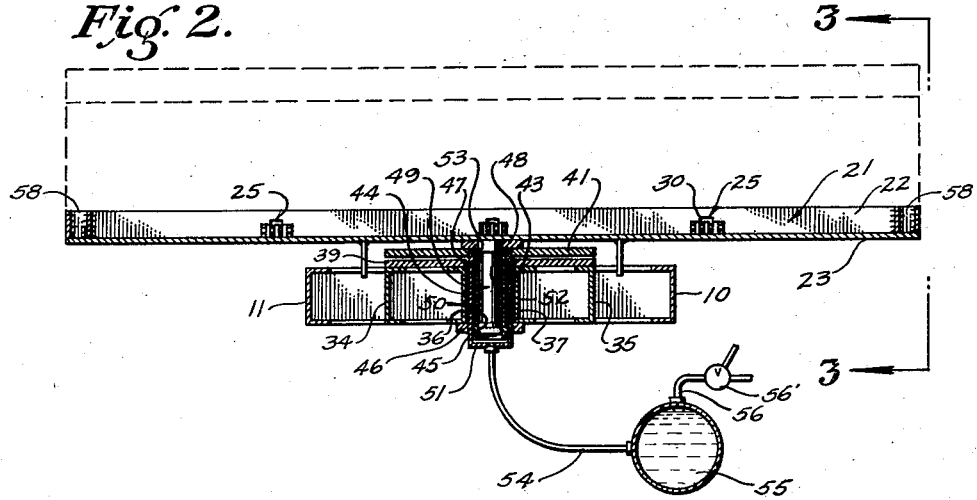
Fig. 2 is a view in transverse vertical section through the bolster and truck platform, as seen on the line 2—2 of Fig. 1, and shows the bolster in its lowermost position in solid lines and in its erected position by dotted lines.

Referring more particularly to the drawings, 10 and 11 indicate longitudinally extending frame members of a truck bed. These members form a suitable support for a bed structure 12. The bed is made of timbers which are laid edge to edge and extend transversely of the frame and are preferably tied together along their outer edges by straps 13. At a point in the length of the bed 12 a bolster structure is formed. This comprises a center board 14 and opposite side boards 15. The center board has straight parallel sides and normally lies in the plane of the truck bed 12 and forms a part thereof when lying in that plane. The side boards are formed of timbers, the same thickness as the center board and are shown as having an end face 16 which is flush with the members 13, a flat face 17 which is parallel to the opposite edges of the center board 14, and inclined faces 18. The faces 18 extend inwardly from the opposite end faces 16 and terminate at a face 19 which is parallel to the end face 16. The faces 19, at opposite sides of the members 15, are spaced a distance apart and are joined by a straight face 20 which is parallel to the straight face 17. The bed 12 is cut away so that the edges contiguous to the faces 18, 19 and 20 will agree in contour therewith. Thus, when the timbers 14 and 15 lie flat in the plane of the bed 12 they will fill the gap between the bed sections and insure that a continuous floor will be formed.

Figure 3:
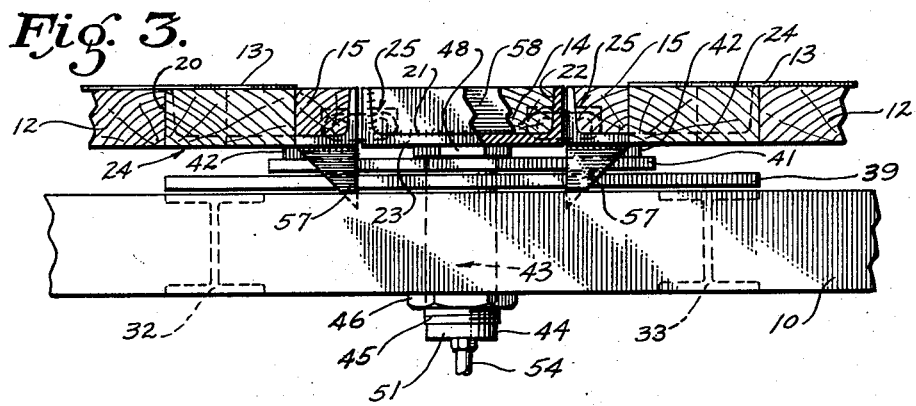
Fig. 3 is a view in end elevation as viewed in the direction of the arrows 3—3 in Fig. 2 and shows the bolster elements when disposed in the common plane of the truck bed.
Figure 5:
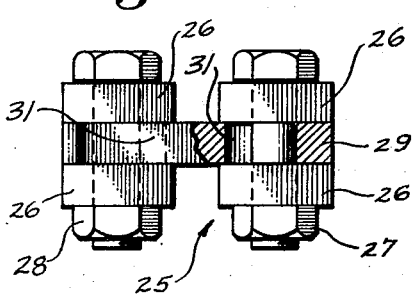
Fig. 5 is an enlarged fragmentary view in plan and shows the articulate connection between the bolster elements.

The present invention is concerned particularly with providing a bolster which can be erected above the surface of the floor 12 or lowered to an unobstructing position. This bolster is made by the use of the timbers 14 and 15. The timber 15 fits within a middle channel member 21, as shown in Fig. 3 of the drawings. This channel has a pair of upwardly extending legs 22 which are connected by a horizontally disposed web 23. The members 15 disposed at opposite sides of the timber 14 are mounted within channels 24. These channels are of full width in the area between the faces 17 and 20 and are cut away to agree with the contour lines 18 at opposite sides thereof. The channels 21 and 24 are articulately connected along contiguous edges by hinges 25. Each hinge comprises a pair of lugs 26 which are secured to the faces of the webs of the channel irons 21 and 24 adjacent to the contiguous edges thereof. These lugs carry pins 27 and 28. As shown in Fig. 5 of the drawing the lugs are spaced a distance from each other to receive an intermediate link 29. The link 29 extends transversely across the meeting edges of the members 21 and 24 and lies in a slot 30 which intersects the contiguous legs of the channels as well as a portion of their webs. The links 29 are formed with elongated slots 31 through which the hinge bolts 27 and 28 extend. These slots allow relative movement between the channel members 21 and 24 for a purpose to be hereinafter described. In Fig. 1 of the drawing it will be seen that three sets of hinges are provided and are distributed throughout the length of the channel member 21.

Extending transversely between the longitudinal frame members 10 and 11 are I-beams 32 and 33. These I-beams are spaced from each other so that their outermost edges agree substantially with the outer edges of the channel members 24. These I-beams are in turn tied together by longitudinally extending outer channels 34 and 35 as well as a pair of longitudinally extending inner channels 36 and 37. The channels 36 and 37 are spaced from each other to form a guideway 38. The channels are tied together by a top plate 39 which is secured by welding or otherwise to the I-beams 32 and 33 and across the tops of the channels 35-37, inclusive. The top plate 39 is formed with a central longitudinally extending slot 40 which agrees in width with the space between the opposing faces of the guide channels 36 and 37. Resting upon the top plate 39 is a bearing plate 41 which agrees in dimensions therewith, and which plate carries complementary latch flanges 42, shown particularly in Figs. 3 and 4 of the drawing, for a purpose to be hereinafter described.

The arrangement of the guide channels 36 and 37 and the guide slot 40 has been provided to accommodate an hydraulic jack 43. This jack is provided for lifting the timbers 14 and 15 to form a bolster having a supporting level above the level of the platform 12. The jack is also intended to provide a pivotal mounting for the bolster around a central vertical axis and will also support the bolster with relation to the top plate 39 so that the jack may move horizontally along the guideway 38 between the channels 36 and 37 and along the slot 40. The jack comprises an outer cylinder 44 which extends through the plate 41 and is fixed thereto. The lower end of the cylinder 44 extends beneath the channels 36 and 37 and has a threaded portion 45 to receive a nut 46. The nut cooperates with the plate 41 to hold the jack cylinder against longitudinal movement while permitting the cylinder to slide along the guideway 38 and along the slot 40. Mounted within the cylinder 44 is a tubular piston 47. This piston has a fluid-tight seal with the wall of the cylinder and reciprocates therein. The upper end of the piston carries a flange 48 which normally rests upon the upper face of the plate 41. Mounted within the tubular piston 47 is a pivot post 49 which is fitted at its lower end with fluid packing 50. Attention is directed to the fact that the lower end of the cylinder 44 is closed, as indicated at 51, and the lower end of the tubular piston 47 is open so that fluid under pressure may act against the lower end of the pin 49. A shoulder 52 is formed on the inner face of the tubular piston 47 and receives a shoulder 53 formed upon the post 49. This limits the downward movement of the post within the tubular piston 47 and at the same time insures that the post 49 may rotate around its vertical axis so that the bolster can move in a horizontal plane around this vertical axis. The hydraulic cylinder 44 is connected with a fluid line 54. This line leads to a tank 55. A line 56 connects with the top of the tank and preferably leads to an air compressor. Thus, when air is delivered to the tank 55 an incompressible fluid will be forced through the line 54 to the bottom of the cylinder. This incompressible fluid is preferably oil.

Figure 4:
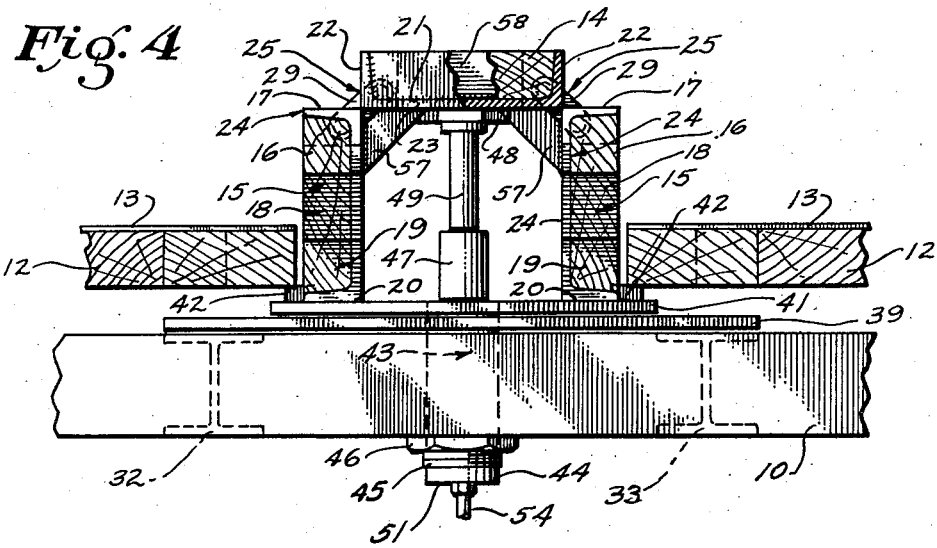
Fig. 4 is a view similar to Fig. 3 but showing the bolster elements in their erected and folded positions.

By reference to Figs. 3 and 4 of the drawing it will be seen that the members 14 and 15 and their associated channel members 21 and 24 are designed to be moved from the position shown in Fig. 3 to the position shown in Fig. 4 by the action of the hydraulic jack 43. In order to properly brace the channel members 21 and 24 when in their elevated position, as shown in Fig. 4, triangular lugs 57 are secured upon the back of each of the channels 24 along the edge thereof contiguous to the channel 21; thus, the brace lugs 57 will assume positions beneath the web 23 of the channel 21 and cooperate with the channels 21 and 24 in holding them rigidly as they form the bolster structure. It is desirable to mount stake pockets 58 at the ends of the channel 21 and between the legs 22 of the channel to receive stakes by which the load is held on the bolster.

In operation of the present invention a truck or trailer bed is made with a main frame comprising longitudinal frame elements 10 and 11, or elements comparable therewith whereby a subframe structure is provided and is suitably supported upon a running gear. Mounted upon the frame is the platform or floor 12 usually constructed of wood and timbers laid crosswise of the frame elements 10 and 11 and anchored with relation thereto. If desired these timbers may be covered by a sheathing plate of metal. The ends of the timbers are tied together by the straps 13 and in the area to be occupied by the bolster structure are cut away to accommodate the edges 18, 19 and 20 of the side timbers 15 forming a part of the bolster. When the side timbers 15 and the center timber 14 of the bolster lie flat they lie in the plane of the platform 12 and fill the space formed in the platform to accommodate them so that the entire platform is flat. When it is desired to employ a bolster in carrying a load air is admitted to the pipe 56 by opening a valve 56' leading from a suitable source of air under pressure. The tank 55 has been previously filled with oil or other incompressible fluid and will be forced into the pipe 54 by the air pressure. This will deliver fluid under pressure to the cylinder 44 of the hydraulic jack 43. Thus, fluid pressure will be exerted against the end of the post 49 and against the end of the tubular piston 47. The piston and the post will then be forced upwardly and will lift the channel member 21 and its timber 14 to the position shown in Fig. 4. As this takes place the channel members 24 and their timbers 15 will be drawn upwardly due to their connection with the channel 21 by the hinge structures 25. The outer free edges of the channels 24, as represented by the edge portions 20, will be drawn inwardly over the top of the plate 41 and over the latch flanges 42. Due to the fact that the hinges 25 are formed with links 29 through which the bolts 27 and 28 pass and in which links slotted openings 31 occur, there is freedom of motion in the hinge structure sufficient to allow the lower legs of the channels 24 to fit beneath the latch straps 42 and for the channels to rest directly upon the upper face of the plate 41. At this same time the bracing lugs 57 will swing in beneath the channel 21, as shown in Fig. 4, after which the delivery of fluid under pressure may be interrupted in its flow to the cylinder 44 to allow the bolster structure, comprising the structural elements 21 and 24 and the timbers 14 and 15, to rest directly upon the plate 41. While in this position the bolster may rotate around the vertical axis of the pivot post 49, and in the event that a longitudinal force is exerted upon the load resting upon the bolster structure the bolster may move bodily as the cylinder 44 of the hydraulic jack 43 is guided along and between the channel members 36 and 37. The length of this travel will of course be limited by the length of the slot 40 in the plate 39. When it is desired to dispense with the use of the bolster structure in carrying a load air pressure may be relieved from the tank 55 so that the piston 47 will move downwardly within the cylinder 44. This of course does not take place until after the lower edges of the channel members 24 have been moved from their hooked position beneath the latch flanges 42. As the fluid is forced from the cylinder 44 the channels 24 will spread out at opposite sides of the channel 21 to assume the position shown in Fig. 3 of the drawings. When this takes place it will be evident that the timbers 14 and 15 will lie flush with the upper surface of the floor 12. Thus, the platform 12 will be entirely flat and clear so that any desired load may be placed upon it without obstruction from bolsters. It is to be understood that while the pivot post 49 and the bolster members 21 and 24 are here shown as being raised and lowered by hydraulically operating means it may be desirable to use mechanical raising means, and furthermore, it may be desirable to actuate the jack solely with a compressible or incompressible fluid.

It will thus be seen that the structure here disclosed provides means incorporated within the floor or platform of a truck or the like, and which means may be manipulated to form a rigid bolster structure elevated above the level of the platform and designed to have pivotal movement in a horizontal plane and also to have limited longitudinal movement in the same plane, the device being simple in construction and easy to operate.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. A platform for a truck or the like, comprising a relatively fixed platform interrupted at a point in its length by an intermediate vertically movable platform section normally lying in the same horizontal plane as the fixed platform section to supplement the same and form a continuous floor structure, a pivot post secured centrally of the movable platform section, a bearing receiving the post and carried by the fixed section, means for moving the post vertically while lifting the movable platform section to a plane above the fixed platform section whereby the movable platform section may swing horizontally around the vertical axis of said post and over the fixed platform section, and a guide structure carried by the fixed platform section and receiving the bearing for the post whereby the post in its bearing may move longitudinally of the platform when the fixed platform section is lifted above the movable platform section.

2. A truck bed or the like, including a pair of fixed platform sections lying in a common plane, their contiguous edges being spaced apart, a movable platform section disposed between the two fixed platform sections and transversely thereof comprising three platform members articulately connected and designed normally to lie flat between the fixed sections and in the plane thereof, and elevating means carried by the truck body in the area between the fixed platform sections and disposed beneath the center platform member of the movable section whereby the center platform member of the movable section may be elevated to a desired horizontal plane above the truck floor and the opposite side members of said movable section may swing downwardly at opposite sides of the center platform member to vertical supporting positions for the central section in its elevated position.

3. The structure of claim 2 including supporting means forming a part of the lifting device whereby the movable section will be supported thereupon for pivotal movement with said supporting means in a horizontal plane around its central vertical axis when said movable section is elevated to its folded position above the horizontal plane of the fixed sections.

4. A combined truck platform and bolster structure, comprising a frame to be carried upon a running gear, a pair of platform sections supported upon said frame and fixed thereto in spaced relation to each other, a movable platform section disposed between said fixed platform sections and comprising a center element and opposite side elements articulately connected with the center element, said elements being adapted to lie flat with relation to each other and in the plane of the fixed platform sections, a sub-frame structure carried by the main frame and disposed beneath the normal position of the movable platform section and centrally thereof, an hydraulic jack carried by said sub-frame and including a vertically movable piston acting against the under face of the center element of the movable frame section whereby the movable frame section may be elevated, a vertical pivot between the jack and said section whereby the movable frame section may swing around a central vertical axis when it is elevated to clear the upper face of the fixed platform sections, and means associated with said jack upon which the side elements of the movable frame section may rest to support a load imposed thereon.

5. The structure of claim 4 including interlocking means between the side elements of the movable frame section and said support to hold the side element in a vertical supporting position.

6. The structure of claim 4 including a guideway within which an hydraulic jack is mountd against vertical but within which it may move longitudinally with the movable frame section.

WHETSTINE B. PRIDY.

REFERENCES CITED

The following references are of record in the file of this patent:

UNITED STATES PATENTS

| Number | Name | Date |
|---|---|---|
| 483,360 | Ludlow | Sept. 27, 1892 |
| 713,501 | Ryder | Nov. 11, 1902 |
| 961,807 | Seibert | June 21, 1910 |
| 968,501 | Turner | Aug. 23, 1910 |
| 1,910,398 | Ludington | May 23, 1933 |
| 2,210,614 | Boyer | Aug. 6, 1940 |
| 2,229,483 | Toulmin, Jr. | Jan. 21, 1941 |

FOREIGN PATENTS

| Number | Country | Date |
|---|---|---|
| 336,676 | Italy | Feb. 19, 1936 |